US010474420B2

United States Patent
Khaira et al.

(10) Patent No.: US 10,474,420 B2
(45) Date of Patent: *Nov. 12, 2019

(54) GESTURE-CONTROLLED TABLETOP SPEAKER SYSTEM

(71) Applicant: Avnera Corporation, Beaverton, OR (US)

(72) Inventors: Manpreet S. Khaira, Portland, OR (US); Shawn O'Connor, Portland, OR (US); Frank Prestrelski, Portland, OR (US); Patrick Allen Quinn, Aloha, OR (US); Richard Andrew Sorensen, Portland, OR (US); Eric Sorensen, Portland, OR (US)

(73) Assignee: Avnera Corporation, Beaverton, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 16/159,333

(22) Filed: Oct. 12, 2018

(65) Prior Publication Data
US 2019/0146746 A1    May 16, 2019

Related U.S. Application Data

(63) Continuation of application No. 15/470,413, filed on Mar. 27, 2017, now Pat. No. 10,198,239, which is a
(Continued)

(51) Int. Cl.
G06F 3/16    (2006.01)
G06F 3/01    (2006.01)
(Continued)

(52) U.S. Cl.
CPC .............. *G06F 3/162* (2013.01); *G06F 3/017* (2013.01); *G06F 3/0304* (2013.01);
(Continued)

(58) Field of Classification Search
CPC ................. G06F 3/0346; G06F 1/1626; G06F 2200/1637
See application file for complete search history.

(56) References Cited

U.S. PATENT DOCUMENTS 9,310,890 B2    4/2016    Brewer
9,645,786 B2    5/2017    Khaira
(Continued)

*Primary Examiner* — Regina N Holder
(74) *Attorney, Agent, or Firm* — Knobbe, Martens, Olson & Bear, LLP

(57) ABSTRACT

A speaker system includes a case, an audio input, speakers, an accelerometer, and a computer processor. The audio input is structured to receive a program audio signal from an audio device. The speakers are configured to play an audio output based on the program audio signal, the audio output causing a vibration of the case. The accelerometer is configured to detect the vibration of the case as well as a user tap on the case. The computer processor is configured to identify a user gesture that includes the tap on the case, to identify the tap apart from the case vibration by processing the detected vibration of the case and the detected user tap on the case based on information from the program audio signal to separate the detected user tap from the detected vibration, and to commence a particular function associated with the user gesture.

20 Claims, 5 Drawing Sheets

Related U.S. Application Data continuation of application No. 14/249,696, filed on Apr. 10, 2014, now Pat. No. 9,645,786.

(60) Provisional application No. 61/927,416, filed on Jan. 14, 2014, provisional application No. 61/924,190, filed on Jan. 6, 2014.

(51) Int. Cl.
  *G06F 3/03* (2006.01)
  *G06F 3/041* (2006.01)
  *G06F 3/0346* (2013.01)

(52) U.S. Cl.
  CPC ............ *G06F 3/0414* (2013.01); *G06F 3/165* (2013.01); *G06F 3/167* (2013.01); *G06F 3/0346* (2013.01); *G06F 2200/1636* (2013.01); *H04R 2201/02* (2013.01); *H04R 2430/01* (2013.01)

(56) References Cited

U.S. PATENT DOCUMENTS

| | | |
|---|---|---|
| 2013/0057489 A1 | 3/2013 | Morton et al. |
| 2014/0078318 A1 | 3/2014 | Alameh |
| 2014/0022189 A1 | 10/2014 | Sheng et al. |
| 2015/0121347 A1* | 4/2015 | Petit .................. G06F 17/5009 717/126 |
| 2015/0180536 A1 | 6/2015 | Zhang et al. |
| 2017/0199716 A1 | 7/2017 | Khaira et al. |

\* cited by examiner

GESTURE-CONTROLLED TABLETOP SPEAKER SYSTEM

RELATED APPLICATIONS

This application is a continuation of U.S. patent application Ser. No. 15/470,413, filed Mar. 27, 2017, which is a continuation of U.S. patent application Ser. No. 14/249,696, filed Apr. 10, 2014, which claims the benefit of priority to U.S. Provisional Patent Application 61/924,190 filed Jan. 6, 2014, and U.S. Provisional Patent Application 61/927,416 filed Jan. 14, 2014. Each of those applications is incorporated in this patent application by this reference.

FIELD OF THE INVENTION

The subject matter disclosed herein relates generally to audio systems, and more particularly, to the control of such a system through the use of a natural user interface which includes several specific gestures.

BACKGROUND OF THE INVENTION

A type of tabletop or portable speaker systems have become quite common that include being sourced audio program material through Bluetooth as well as USB-connected, docked or an audio cable. The source of the audio might be from any variety of portable electronic device such as a smartphone, tablet computer, portable audio player and the like. Some such systems may be battery operated for portability or may be connected to wall power through a power cable.

There is a trend in the control of electronics to attempt to simplify the user interface. The use of voice recognition is the direction that is currently the most common to address this. There is an additional way to greatly simplify the control of a Tabletop Speaker System (TSS) and that is through the use of physical gestures instead of buttons, dials and sliders. This can be achieved by reducing the number of controls to a single "magic" button and including accelerometer and proximity detection to the TSS. the inclusion of these detectors makes it possible to determine that a user is tapping the case or gesturing (hand movement near the TSS).

SUMMARY OF THE INVENTION

Embodiments of the present invention provide improved apparatus, systems and methods for communicating with a portable electronic device to gesture-based commands.

In this description, where the specification refers to "a", or "an", or "one", or "the" such as: a microphone, a speaker, one button, an amplifier, the PD, the processor, an accelerometer, the USB interface, etc.—embodiments of the invention explicitly may include one or more of such items. Thus, "one" includes "one or more," "the" includes a plurality of", "a" includes "one or more", "an" includes "one or more." Each of the above items, wherever described, as a singular item, can be a plurality—i.e. 1–n of said item.

In one embodiment of the invention, the TSS includes of art encased system including speakers, an amplifier, a processor, storage memory, an accelerometer, a proximity detector (PD), a microphone, and interconnections to an audio source which may include, wireless (Bluetooth, WiFi, etc.), USB, a docking interface, or an audio cable.

In general, the two types of mentioned sensors (PD and accelerometer) are synonymous with "gesture sensors" general. For example, a PD might be realized in any relevant technology, such as sonar, IR, motion, light, visual imaging, etc. An accelerometer might be realized in any relevant technology, such as integrated Circuit (i.e. micro electromechanical systems, i.e. MEMS), gravity gradiometers, piezoelectric, piezoresistive, capacitive, quantum tunneling, etc.

It can be quite challenging to attempt to detect physical contact, such as finger taps of a user to a case in the presence of audio being played through a TSS. This becomes especially difficult in attempting to detect a Single Tap (ST) or a Double Tap (DT) to the case of the TSS in the presence of loud music—especially music with a lot of bass content—through the speakers of the TSS. In one embodiment of the invention, to improve the detection of intentional user input via touches or taps to the case of the TSS, embodiments of the invention include the use of the music program material, or a processed version of it, to improve the reliability of detecting an intentional user gesture such as a tap to the case. In this way, the vibrations (acceleration) that are coming from the speakers can be accounted for in the detection, greatly improving the signal-to-noise of those intentional user inputs and thus improving the reliability and usability of tapping gestures in the presence of case vibrations from the speakers when audio is playing.

With a proximity detector (PD) located near an upper or top surface of the TSS case, in another embodiment of the invention, it is possible detect the height of a hand that is placed above the proximity detector. In accordance with embodiments of the present invention, this allows a user to, for example, increase the volume of the music playing through the TSS as the hand is moved in an upward direction and to decrease the music volume as the hand is moved in a downward direction. Further, the user can easily mute the volume by bringing the hand all the way down to the top surface of the TSS and leaving the hand in contact or near-contact with the RD for a pre-determined time. In a similar fashion, the same gesture raising or lowering the hand above the PD) can be used to control any parameter that the firmware running on the process should decide is appropriate. It is possible for these gestures to be interpreted in a context-dependent manner. In this way, the same gesture (e.g., up or down hand above the PD) can mean different things under different conditions. Such differing conditions might include things like: paired or un-paired, active or in standby, muted or un-muted, playing music (or any sound source) or not playing music (or any sound source), alarm clock set or not-set, alarm sounding or not-sounding, and any other type of distinguishable conditions. It is possible for the "raising-hand-above PD" gesture described above to also be reversed in its sense. Thus, "raising-hand-above PD" might also be interpreted as lowering the volume. Likewise "lowering-hand-above PD" could be reversed in meaning. Thus, "lowering-hand-above PD" might also be interpreted as raising the volume. Any gesture described in this specification can likewise be used as described or in a reversed sense.

Another gesture that is recognized and acted on by embodiments of the invention is the detection of a hand being waved past the PD located on the top of the case of the TSS. The gesture is to pass the hand either from left to right or from right to left above the PD. The PD in this case sees something akin to an impulse in its response as the hand passes briefly over the PD. While this gesture can be used for any function, for example, any of those described in this specification, it is especially well suited to be interpreted as a "snooze" function for a clock radio or alarm clock function which is either running natively on the TSS, or one that is running on a connected smart electronic device. When the snooze gesture is detected, any sound that is playing through the TSS would be muted for a predetermined amount of time, for example, 10 minutes.

It is also possible to detect a hand being passed back and forth over the PD. A single pass of the hand over the PD may be referred to as a Single Wave (SW) gesture. If the hand is passed back and forth, the PD would detect two impulses of proximity. This Double Wave (DW) gesture can be independently detected from the SW gesture. The DW gesture (like the SW gesture) can be used for any function, and specifically for any function described in this specification. As was true of the ST and DT gestures, SW and DW gestures can be used in sequences and in combination with other gestures (ST, DT, SB, DB) to form more complex gestures that can all be distinguished by the processor in the TSS. SB and DB gestures are described below.

In another embodiment of the invention, it is possible to affect a mute or unmute control operation on the TSS by performing a DT on the case at any time. Specifically, if music is playing through the TSS, a DT would mute the audio. If the audio is currently in the muted state, then a DT would unmute the audio (returning the volume from zero to its previously-set volume.) The timing for the ST and DT operations is determined by the firmware (FW) running on the computer in the TSS. As the accelerometer experiences a signal, this signal is digitized and evaluated by the computer's FW and/or hardware (HW) to determine that the case was tapped. If the timing between subsequent taps is longer than a predetermined value (perhaps 1 sec, for example), then the FW would conclude that a ST had occurred. If the timing between subsequent taps is shorter than a predetermined value (perhaps 200 mS, for example), then the FW would conclude that a DT had occurred. In this way, the FW (or HW) can reliably detect that a user performed an intentional control input of ST, DT or n-tap (i.e. 3, 4 or more taps in rapid succession.)

It is possible to greatly expand the number of tapping gestures that the TSS can detect by grouping ST and DT into bundles. In this way, similar to Morse code, a ST might represent a "dot" and a DT might represent a "dash," This allows for more complex messages to be used as gesture-based control inputs to the TSS.

To simplify the control the number of buttons in the TSS described in this invention has been reduced to one. This single button can be used in a variety of ways. In the same way that one might have clone a ST or DT (or n-tap) on the TSS case as a control signal, it is also possible to do single button press (SB) or a double button press (DB), or an n-time press. The timing descriptions for ST and DT can also be applied to the durations between the button presses. It is also possible to interact with the button by performing a Long Button press (LB) or a Quick Button press (QB). When evaluating a button press, the duration of holding the button is evaluated. If the duration of holding down the button is shorter than a predetermined value (perhaps 200 mS, for example), then the FW could conclude that a QB had occurred, if the duration of holding down the button is longer than a predetermined value (perhaps 1 sec., for example), then the FW could conclude that a LB had occurred. In this way, the FW (or HW) can reliably detect that a user performed an intentional control input of QB, LB. In a fashion similar to the use of complex messages being possible using sequences of ST and DT, it is also possible to make complex messages by using sequences of QB and LB.

A third type of button press may be recognized, which is the Very Long Button press (VLB). This is a button press lasting significantly longer than the LB. The VLB would be detected if the button were held down for a predetermined time, longer than the LB time, perhaps, for example, 3 seconds.

It is also possible to form even more-complex gestures using combinations of the gestures previously described. For example if one is holding a press of the button while the case is tapped as a ST or DT (or n-tap), then this message could mean something special. It is possible to combine any and all of the gestures. For example, a ST with one hand while a downward hand gesture is being, made above the proximity detector with the other hand, might take on a specific meaning. Any and every combination of single or multiple button presses and/or timed button presses, ST, DT, and n-tap gestures, and upward, downward and hand-held-on-the-proximity-detector gestures are explicitly reserved as intended by the present invention.

One gesture that is especially useful is to perform a Bluetooth "pair" function with a Bluetooth device when a ST gesture is made using the "to-be-paired" portable electronic device. By using the portable electronic device itself to tap the case of the TSS, both the TSS and the "to-be-paired" portable electronic device will experience a ST at the same instant, it is unambiguous to both devices as to which devices are to be paired. Special software running on a portable electronic device may be used to enable this "tap to pair" gesture.

Any of the above-described gestures—ST, DT, SW, DW, SB, DB, n-tap, LB. LVB and QB gestures can be used in sequences and in combination with any other gesture to form more complex gestures that can all be distinguished by the processor in the TSS and used as triggering events to cause the TSS to perform pre-defined actions.

It is a very good idea to reserve a method for performing a reboot of the FW and possibly a reset of any temporarily-stored parameters that are running on a product. It is always possible that a product's FW might find itself in a state that is un-responsive to most or all of its FW-based detection capabilities. These would certainly include the accelerometer and proximity detection signals. Thus, the one input button that some embodiments of the invention use is the sole and a very reliable input to the FW that conies from outside the FW itself. It is envisioned that a VLB would be used to affect a FW reboot. In the event that the FW cannot recognize the button at all, then it is envisioned that the source of power (wall plug and/or batteries) would be removed. Then, the operator would press and hold the button (a VLB) while the power (wall plug and/or battery) is re-attached. This would then either directly perform a reboot to factory defaults, or could engage an interaction with the user wherein the user would be prompted to select among two or more reset/reboot options. For example, the user could be asked (via voice prompt) if they wished to keep any custom configuration settings they may have selected or if they wish a complete reset to factory defaults.

BRIEF DESCRIPTION OF THE DRAWINGS

The subject matter disclosed herein is illustrated by way of example and not by limitation in the accompanying figures in which like reference numerals indicate similar elements and in which.

DETAILED DESCRIPTION OF THE PREFERRED EMBODIMENTS

As will be understood by those skilled in the art, the present invention may be embodied in other specific forms without departing from the essential characteristics thereof. Various configurations described herein may be combined without departing from the present invention. The above described embodiments of the present invention are presented for purposes of illustration and not of limitation. The present invention also can take many forms other than those explicitly described herein. Those skilled in the art will recognize, or be able to ascertain, using no more than routine experimentation, many equivalents to the specific embodiments of the invention described herein. Accordingly, it is emphasized that the invention is not limited to the explicitly disclosed methods, systems and apparatuses, but is intended to include variations to and modifications thereof.

Figure 1:
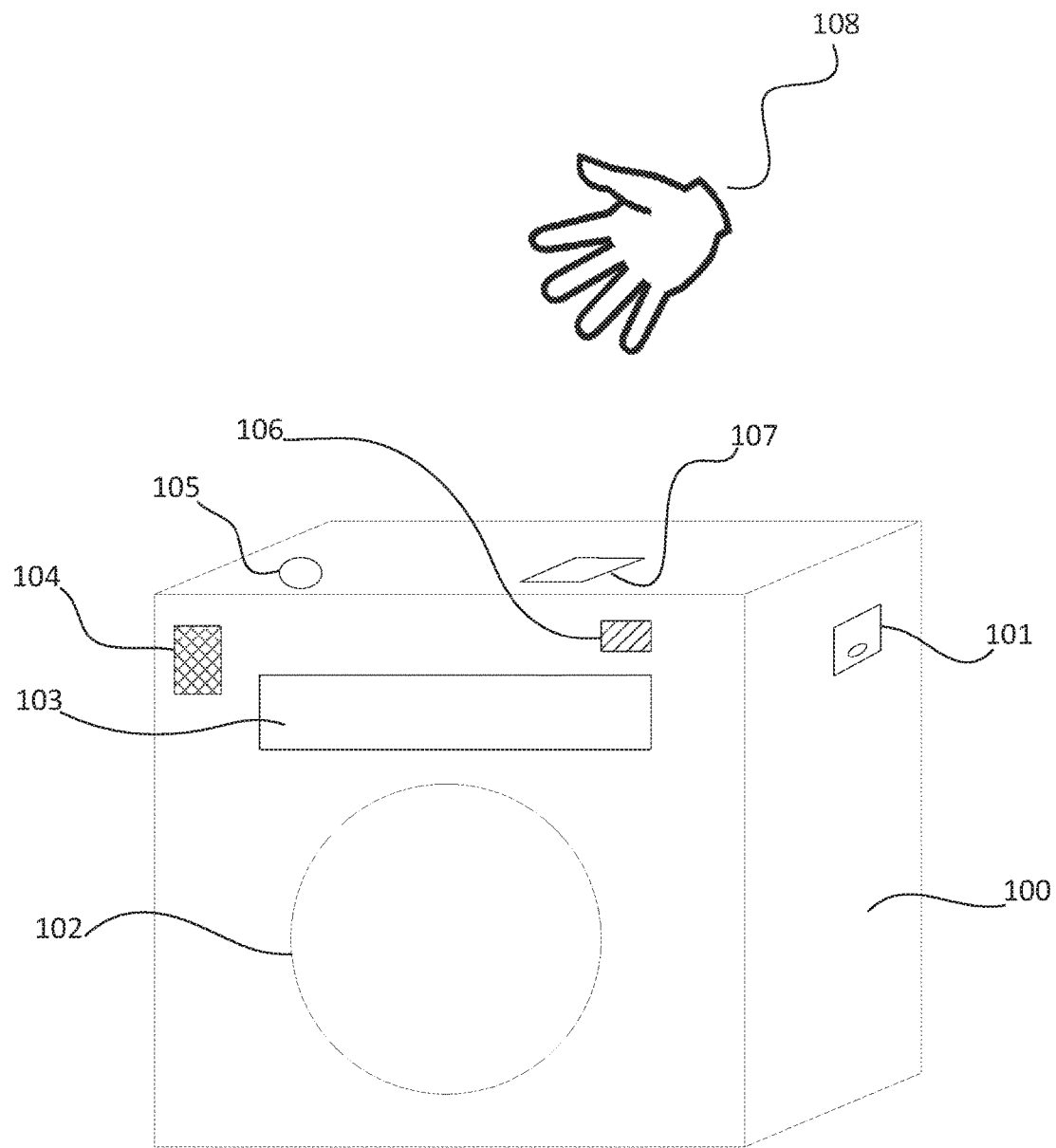
FIG. 1 is a simplified perspective drawing of the Tabletop Speaker System (TSS) showing the major components and interfaces contained within, as well as a user hand that interacts with the TSS.

FIG. 1 shows a Tabletop Speaker System (TSS) 100 with the most important components illustrated. TSS 100 is a speaker system for playing audio content which is connected to TSS 100 through one of the several possible methods available from the audio interface 101. This audio interface 101 may include a wireless connection such as Bluetooth or WiFi, USB, baseband audio cable (e.g. 3.5 mm stereo), optical, or any other method to get a digital or analog audio source to the TSS 100. The audio content that is received through the audio interface 101 is then brought into the electronics contained in TSS 100 which may include analog-to-digital converters, a microprocessor (processor 202) and an audio amplifier (not shown.) The amplified audio signal is then presented to the speaker 102. The audio system of TSS 100 may include one or more speakers 102 that support any common audio arrangement such as monaural, stereo, 2.1 (stereo plus a subwoofer), etc.

Figure 2:
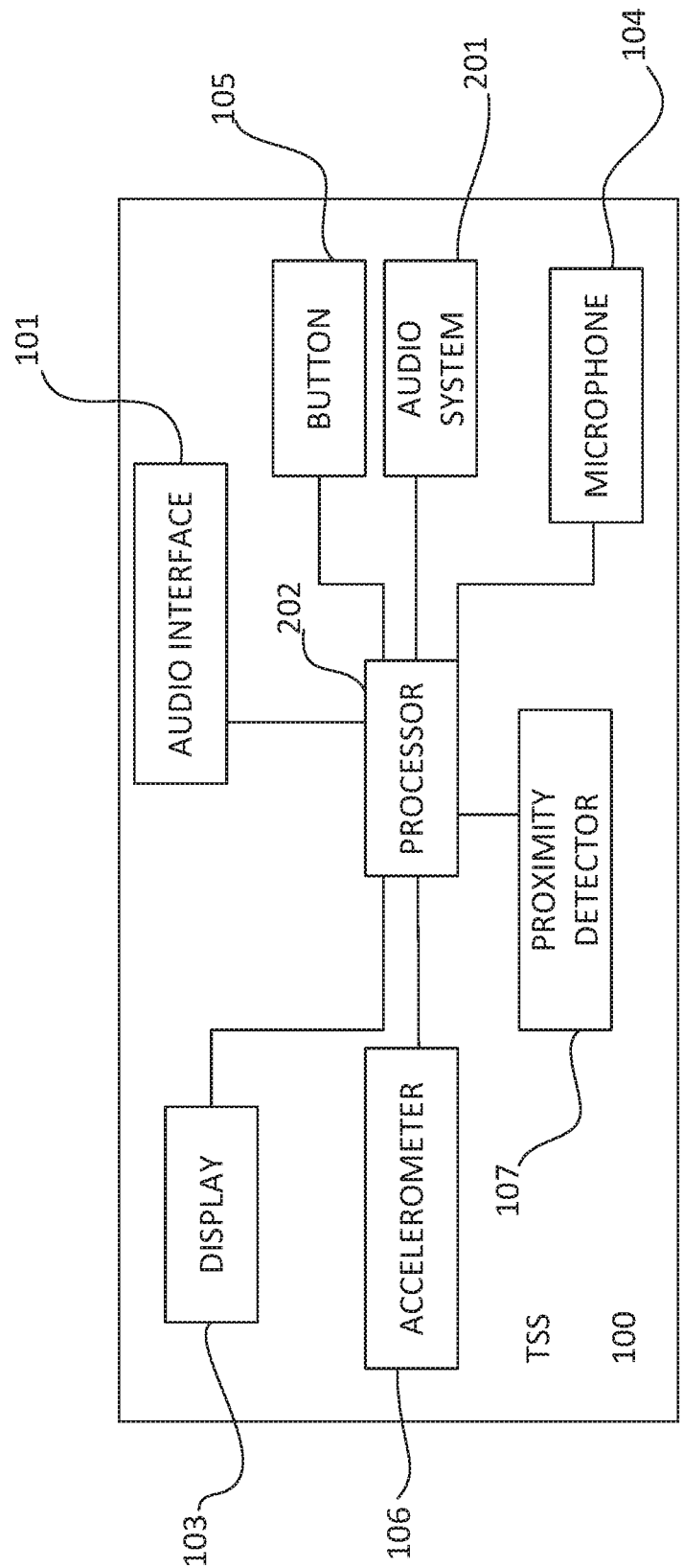
FIG. 2 is a simplified functional block diagram showing, various components of a system according to an embodiment of the present invention, the system including the TSS of FIG. 1 and portable electronic device.

FIG. 2 illustrates a simplified functional block diagram of a Tabletop Speaker System (TSS) 100 that includes a processor 202, audio interface 101, control button 105, audio system 201, microphone 104, proximity detector (PD) 107, accelerometer 106 and display 103. The processor 202 may include a DSP, microprocessor, various control and interface circuits and an analog to digital converter. Audio system 201 contains digital to analog conversion, amplifiers and speakers 102.

A display 103 is included, which may be used to display visual information, such as by presenting text, changing brightness, or using colored indicators. The display 103 may be used to present a real-time clock, track and other audio-navigation information, feedback information regarding how the sensors, detectors and input button are configured or operating, processor 202 operating status, power status and generally, any information that would be useful to a user regarding the status or performance of TSS 100.

One or more microphones 104 are included to allow for such capabilities as voice recognition, which might be used to control the TSS 100 or some portable electronic device connected to the TSS 100 via the audio interface 101, noise reduction, audio calibration (such as room equalization), and generally, to input any acoustic audio signal to the TSS electronics and processor 202.

A single button 105 is included that can be used in a multitude of ways wider different circumstances during the operation and control of TSS 100. Button 105 would typically both close a switch that is readable by the processor 202 inside TSS 100 as well as connect directly to a processor 202 pin as to change the way the processor 202 boots up after a power cycle (removal of the AC-wall power or DC-battery power and then re-applying said power.) Because button 105 can affect the boot process of the TSS 100, this button can serve as a factory reset to ensure that no matter what state of dysfunction TSS 100 might find itself in, it can be recovered to factory defaults by holding button 105 down as power is applied to the TSS. Upon recognizing the power-on pressing of button 105 (applying AC/DC power to the TSS while button 105 is held down), the TSS 100 could chose to engage the user in a variety of boot options. These options could be presented to the user via audio prompting from the speakers 102 or visual prompting from the display 103, or some combination of the two. Such an interaction might lead the TSS 100 to boot in various ways, such as choosing to keep user configurations or not.

An accelerometer 106 is included which allows the processor 202 in TSS 100 to ascertain when the user has touched or tapped the case of TSS 100. This tapping of the case can be used as a control signal to change some aspect of the behavior of TSS 100. For example, a Single Tap (ST) on the case might be used to indicate or initiate such things as alerting the TSS 100 that a voice command is imminent, or to turn on the display, or to put the TSS 100 in standby. Generally, a ST is an assignable control signal. By performing a Double Tap (DT) on the case of TSS 100, the user has provided the processor 202 with a second type of command. This command can likewise be assigned to perform any control function the TSS Firmware (FW) is designed to do. A specific use of the DT that is especially valuable is to have it mute the audio at any time. This might be something a user would want to do when a phone call comes in, or a person comes into the room. If the audio is muted, then the DT command could be used to unmute (i.e. turn the audio back up to its previously-set level) the audio coming out of speaker 102. Descriptions of ST and DT are provided above.

It can be challenging to reliably discriminate intentional ST and DT behavior in the face of the vibrations from audio playing through speaker 102 as well as vibrations front other audio sources in the room (not related to the sound.) To improve the reliability of ST and DT detection, the processor 202 in TSS 100 can utilize information in the audio source it received through audio interface 101 to "account for" (i.e. reduce the vibrational interference caused by) the vibrations coming from that audio source and playing through speaker 102. In addition, it is possible for the processor 202 to evaluate sound vibrations that are picked up on microphone 104 from sound sources that came from the room environment and also "account for" these sources of noise as well. Doing these things will improve the detection of intentional user taps that are made to the case of TSS 100.

A proximity detector (PD) 107 is included that allows the processor 202 in TSS 100 to determine if an object (usually the hand 108 of a user) is some calculable distance away from the sensor. A hand 108 is shown in FIG. 1 that depicts a user bringing his hand to a position essentially above the proximity detector. The PD 107 will provide a signal to the processor 202 in TSS 100 that will allow the TSS 100 to determine what height the user's hand 108 is above the PD 107. This ability to measure the distance of the user's hand above the top surface of the TSS 100 makes it possible to calculate that the user is lowering their hand towards the top of the TSS 100 or raising their hand above and away front the top of the TSS 100. These two gestures are ways to inform the processor 202 of the TSS 100 that the user is wishing to input a change to a variable.

For instance, raising hand 108 above the PD 107 can be used to cause the TSS 100 to raise the volume of the audio being played out speaker 102. Lowering of hand 108 toward the PD 107 can be used to lower the volume of the audio playing out speaker 102. Et is possible for PD 107 to detect that hand 108 is essentially touching the PD 107. The processor 202 could then decide to interpret that essentially touching of PD 107 as a command to mute the audio (volume=zero) or to put the TSS 100 into "standby mode" (a low-power mode of operation with everything possible ed off except the ability to exit standby mode.) It might be more natural to only enter mute or standby if the hand 108 is held essentially on PD 107 for some minimum predetermined time (for example, 1 second).

As described above, the PD 107 may be used as a proximity detector or as a motion detector. This may also be referred to as gesture recognition hardware. Such gesture recognition hardware in the TSS 100 may include a transmitter (TX) IR diode and a receiver (RX) IR diode located inside the case of the TSS, but having an ability to transmit and receive IR signals though an opening in the case. The TX and RX diodes are generally located side h side with a physical barrier between them to prevent the TX signal from being seen directly by the RX without having bounced off an object brought into the field of view of the proximity detector.

Another gesture that TSS 100 could detect and use is when hand 108 is passed above the PD 107 in a left-to-right or a right-to-left motion. This motion might be called a "wave." When a wave is performed, PD 107 first measures no obstruction and then the sudden appearance of a near obstruction which then returns to no obstruction as the hand is passed over the PD 107. In this way, the PD 107 can pass a specific proximity signal to the processor 202 in the TSS 100 which will detect this wave gesture and perform some appropriate action. For example, the response to the detection of a wave gesture might be to perform a "snooze" function on a clock radio or alarm clock function that is running either locally on the TSS 100 itself, or on a connected smart electronic device.

Another function performed by TSS 100 is that of echo cancellation and noise reduction. This can occur when microphone 104 passes the sound it is picking up from the room on to the processor 202 in TSS 100. Since the processor 202 knows what sound is coming out of speaker 102, it can use that sound from the signal from microphone 104 and calculate a signal that is representative of room reverberations or echo that may be present in the room. This calculation basically creates an acoustic model of the room. This capability allows the processor 202 to introduce a compensating signal into the audio coming, out of speaker 102 which may cause to decrease environmental coloration (such as reverberation and echo) of the audio that is intentionally being played. The net result is an improved listening experience Techniques of noise cancellation may include those described in U.S. patent application Ser. No. 14/148, 533, filed Jan. 6, 2014, entitled Noise Cancellation System, and incorporated by reference herein.

Once the processor 202 in TSS 100 has acquired a model of the room acoustics as described in the previous paragraph, it is then possible to use this room acoustic model to improve the fidelity of a user's voice who is speaking to TSS 100 through microphone 104. In this way, voice input to the TSS 100 can be made more reliable and error free.

Figure 3:
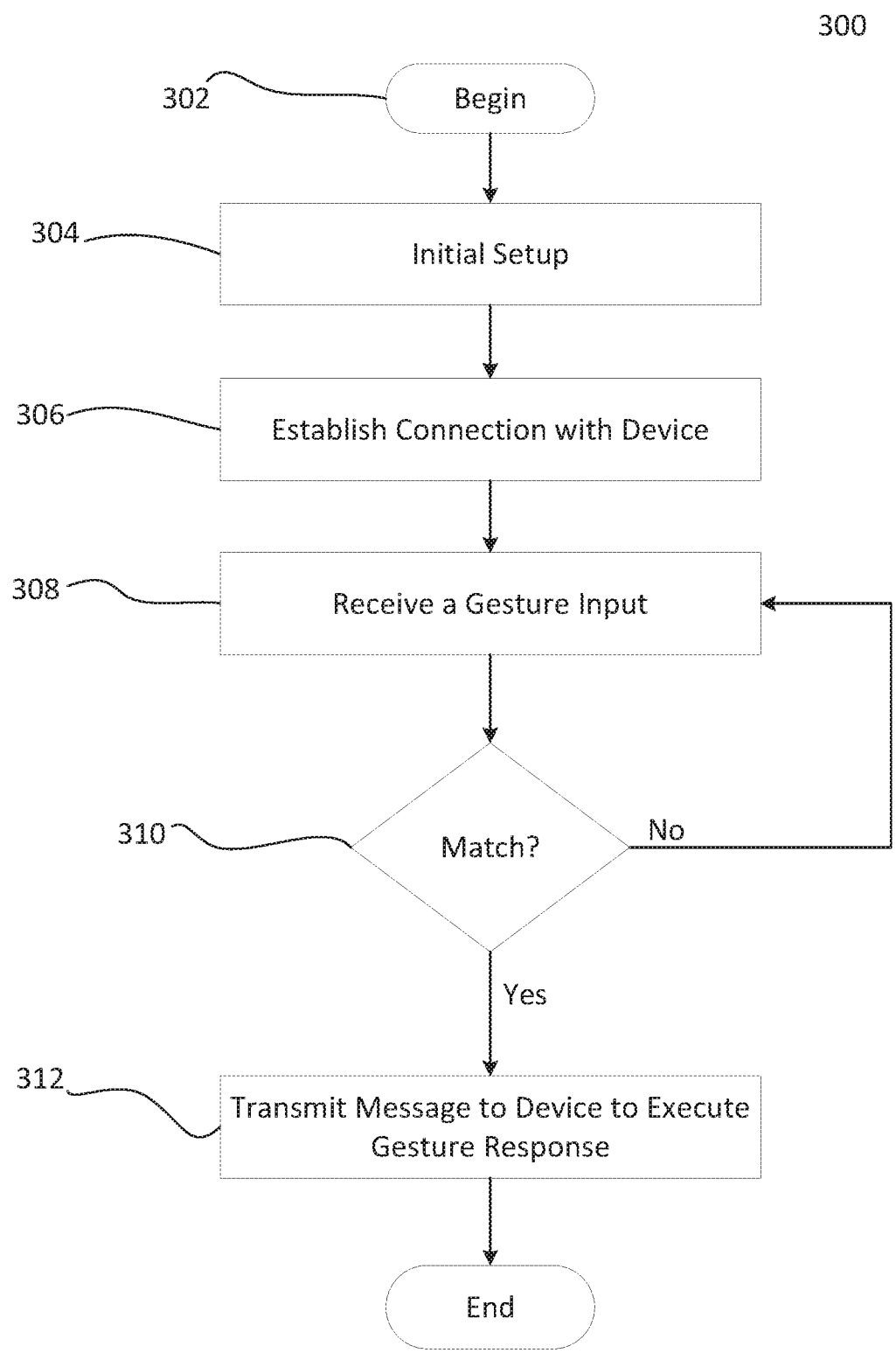
FIG. 3 is a flow diagram of a process usable by a TSS to activate a gesture recognition commands in portable electronic device according to embodiments of the invention.

FIG. 3 illustrates a flow diagram of a process 300 usable by TSS 100 to operate gesture-initiated functions or behaviors in a portable electronic device 120 and/or TSS 100 according to an embodiment of the present invention.

At block 302, TSS 100 can perform an initial setup process with a user, according to an embodiment of the present invention, wherein a user is may be prompted by TSS 100 to provide gesture input in the form of a tap or hand via accelerometer 106, or proximity detector 107. In response, gesture-input devices (accelerometer 106 and proximity detector 107), can transmit the gesture input to processor 202 of TSS 100 as an electrical signal. Processor 202 can digitize the electrical signal using an analog-to-digital converter and store the digitized signal as an audio file in an internal storage device.

At block 304, TSS 100 can establish communication with portable electronic device 120. For example, upon detecting that portable electronic, device is connected, TSS 100 can communicate with portable electronic device 120 (not illustrated) to perform a number of authentication steps by exchanging messages across connector 101 shown in FIG. 1. TSS 100 and portable electronic device 120 can also exchange messages wirelessly via connection 130. In an embodiment of the present invention, TSS 100 can transmit a message to portable electronic device 120 to identify and authenticate TSS 100, and portable electronic device 120 can transmit a message to TSS 100 to identify and authenticate portable electronic device 120.

Messages exchanged at block 304 can also relate to the respective capabilities of TSS 100 and portable electronic device 120. For example, portable electronic device 120 can transmit a message to TSS 100 indicating that portable electronic device 120 is configured to accept and act on a received message instructing portable electronic device 120 to respond to a gesture-input at TSS 100. Similarly, TSS 100 can transmit a message to portable electronic device 120 indicating that TSS 100 is configured to generate and transmit a message instructing portable electronic device 120 to respond to gesture input commands. In embodiments of the present invention, TSS 100 and portable electronic device 120 can exchange messages relating to their respective capabilities for handling messages related to using gesture commands in portable electronic device 120, and the exchange of voice input and audio output Upon completion of the exchange of messages relating to capabilities and authentication between portable electronic device 120 and TSS 100, portable electronic device 120 can activate a low power "sleep" mode wherein one or more functionalities of portable electronic device 120 are deactivated to conserve battery power. For example, portable electronic device 120 may deactivate a display screen or other user interface component.

At block 308, gesture input devices (107, 106) of TSS 100 can detect gesture input from the user. Gesture input devices (107, 106) can transmit the gesture input as an electrical signal to processor 202. Further, upon receipt of the gesture input, processor 202 can deactivate the listening mode of TSS 100, and the process 300 can proceed to decision 310.

At decision 310, processor 202 of TSS 100 can determine whether the received gesture input "matches" the stored gesture profile that is either stored in a storage device connected to processor 202 or established during the initialization step 302. To determine a match, processor 202 can compare one or more data points of the received gesture input to the stored gesture profile.

If at decision 310, processor 202 determines that the received gesture input does not match the stored audio file, the process 300 can return to block 308 wherein TSS 100 continues awaiting gesture input. For example, if the received gesture input corresponds to a different tap or hand movement by the user than that of the stored gesture profile, processor 202 can continue to monitor the gesture-input devices (107, 106) for further gesture input.

if at decision 310, processor 202 determines that the received gesture input matches the stored gesture profile, the process 300 can proceed to block 312. For example, if processor 202 determines that one or more data points of the received gesture input are the same for substantially the same) as corresponding data points of the stored gesture profile, the process 300 can proceed to block 312.

At block 312, processor 202 of TSS 100 can transmit a message to portable electronic device 120 to respond in a specific way to the gesture message via connector 101 shown in FIG. 1. In response to the received message, portable electronic device 120 can execute some specific operation or behavior. Similarly, after receiving a "match" the resulting command could be used at the TSS 100 itself to operate some specific operation or behavior in the TSS 100 itself.

Figure 4:
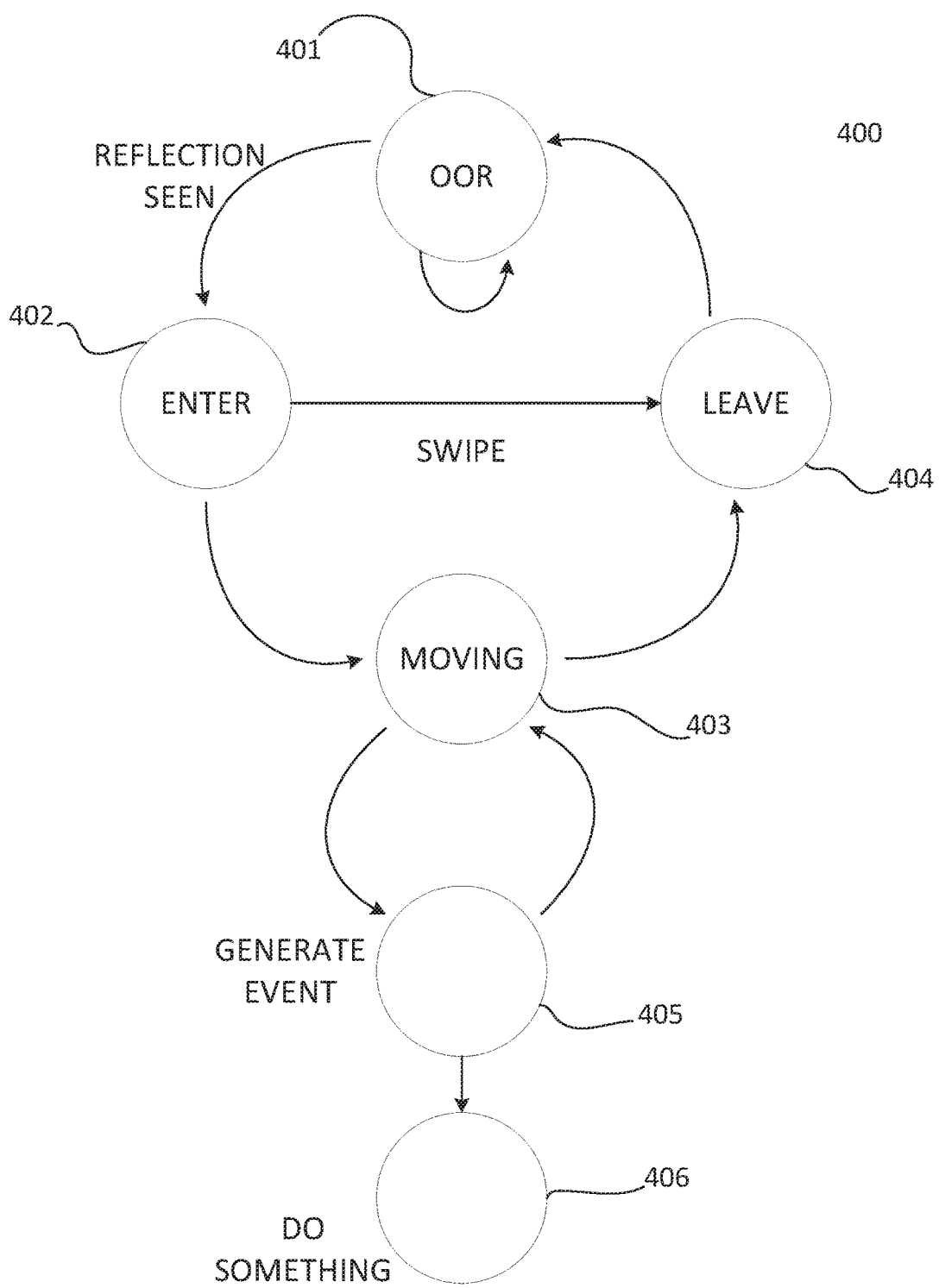
FIG. 4 is a state diagram of a process usable by a TSS to activate motion gesture recognition commands according to embodiments of the present invention.

FIG. 4 is a state diagram of a process usable by a TSS to activate motion gesture recognition commands according to embodiments of the present invention. As illustrated in FIG. 4, software in the TSS 100 that handles the motion detection will put itself in a loop at state 401 whenever all objects in the field of view of the proximity detector are Out Of Range (OOR.) In this situation, no object (such as a hand) is detected as having bounced off of something. Thus the RX diode has not received any of the signal sent out by the TX diode. The software remains in the loop state 401 until a reflection is detected. When a reflection is detected, or seen, the software state progresses to recognizing that something has entered the field of view and the software enters the ENTER state 402. If a hand is moved quickly into and then out of the field of view, then a "SWIPE" gesture will have been made and the software acknowledges the removal of the object from the field of view by progressing to state LEAVE 404. After the leave state is recognized, and the object leaves the field of view, the state returns to OOR 401.

In the case that an object enters the field of view of the proximity (motion) detector at 402 and continues in the field of view and is moving in that field rather than quickly leaving the field of view, then the software enters the state MOVING 403. In this state, the signal strength of the RX receiver diode is measured by an Analog to Digital Converter (ADC) and the software can thus make a measurement of how close the object is to the proximity detector. This is because the signal strength at the RX is stronger for close reflections and weaker for distant reflections.

Having made a measurement of the distance of an object above the case of TSS 100, the software generates a gesture-recognition event at 405 if the movement profile is recognizable. The end result of the gesture recognition is to perform some function either within the TSS 100 itself or the portable electronic device 120. This action is performed at state DO SOMETHING 406. While some action is being performed, the software continues to monitor the proximity detector at MOVING 403 until the object leaves the field of view, at which point the software will enter state LEAVE 404.

Figure 5:
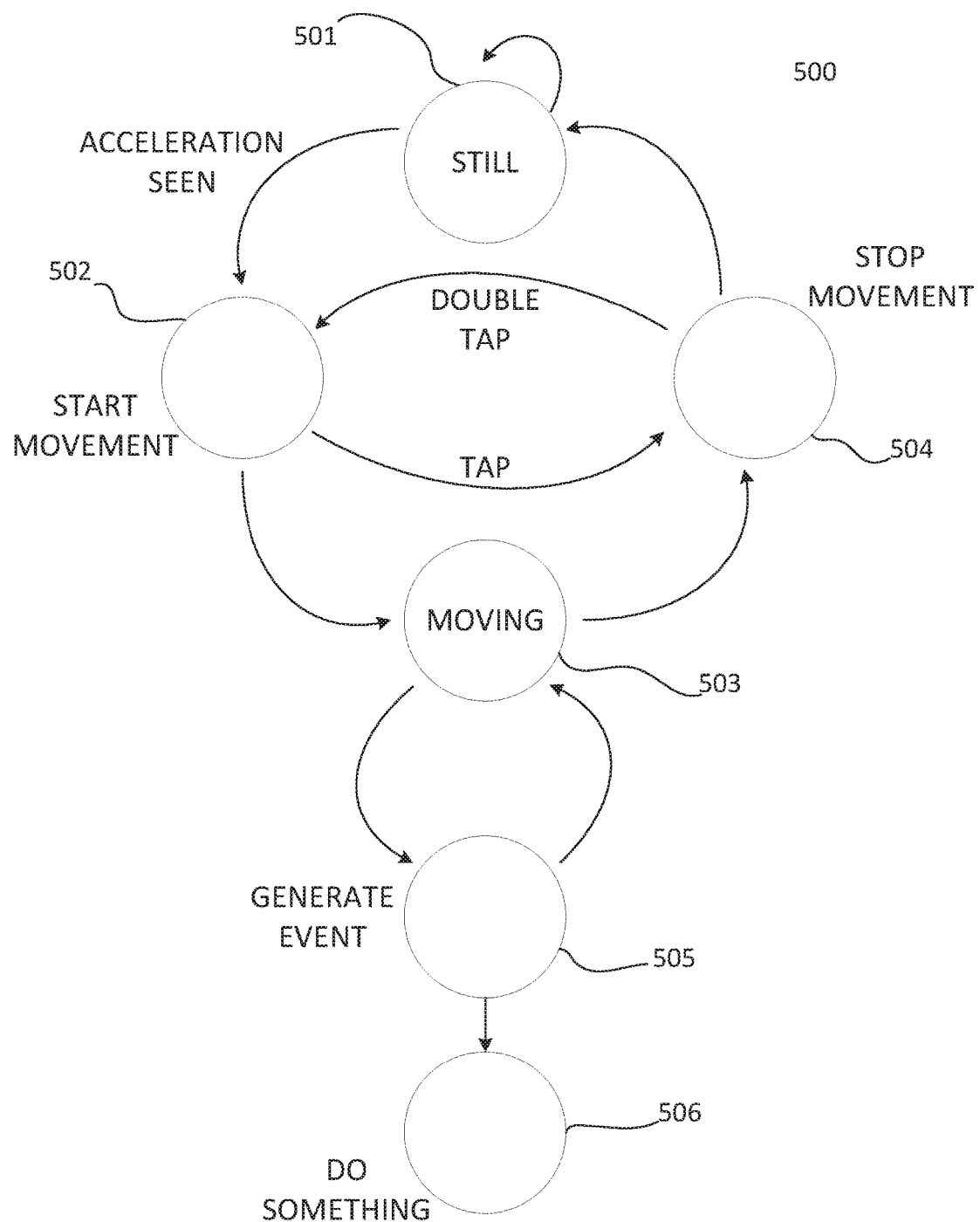
FIG. 5 is a state diagram of a process usable by a TSS to activate touch gesture recognition commands according to embodiments of the present invention.

FIG. 5 is a state diagram of a process usable by a TSS to activate touch gesture recognition commands according to embodiments of the present invention.

The gesture detection hardware in TSS 100 also includes an accelerometer which is used to detect vibration or accelerations applied to the case by a user tapping or striking the case of TSS 100. The behavior of the software in the TSS 100 associated with the accelerometer is similar to that used for the proximity detector. When there is no acceleration signal detected, the acceleration detection software will be in the state STILL 501. When an acceleration is observed, the software progresses to START MOVEMENT 502. If the movement consisted of a brief signal that stops, then a "TAP" to the case has occurred and the software progresses to STOP MOVEMENT 504. If there is no subsequent movement of the case, then the software returns to STILL 501. If on the other hand, a second tap to the case is seen, then the software leaves STOP MOVEMENT 504 and returns to START MOVEMENT 502 and recognizes the presence of a "DOUBLE TAP" gesture. In this way, triple, quadruple and taps of any number can be detected by the software.

When taps, double taps or more complex motions are detected, the software progresses to GENERATE EVENT 505, wherein the specific type of acceleration gesture is evaluated and a software event is created that is appropriate. Once the proper gesture is recognized, then the software in TSS 100 proceeds to initiate some activity at DO SOMETHING 506 (such as muting the volume). While activities are being, performed at 506, the gesture detection software continues to monitor any case acceleration at MOVING 503 and will proceed on to STOP MOVEMENT 504 if the acceleration has stopped. The software might then return to STILL 501 where it will await the arrival of a new episode of case acceleration.

Embodiments of the invention may be incorporated into integrated circuits such as sound processing circuits, or other audio circuitry. In turn, the integrated circuits may be used in audio devices such as speakers, sound bars, audio docks, amplifiers, etc.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated.

In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention.

The invention claimed is:

1. An audio system comprising:
   a speaker configured to output audio corresponding to audio content;
   a vibration detector configured to detect a set of vibrations; and
   a hardware processor configured to distinguish a first vibration from the set of vibrations and a second vibration from the set of vibrations based at least in part on the audio content received by an audio receiver, the first vibration corresponding to the audio output by the speaker and the second vibration corresponding to interaction by a user with the audio system.

2. The audio system of claim 1 wherein the audio content is received from an electronic device via a wireless connection.

3. The audio system of claim 1 wherein the audio content is received from an electronic device via a wired connection.

4. The audio system of claim 1 wherein the vibration detector includes one or more of an accelerometer, a piezoelectric sensor, or a piezoresistive sensor.

5. The audio system of claim 1 wherein the second vibration corresponds to the user tapping the audio system.

6. The audio system of claim 1 wherein the hardware processor is further configured to:
   determine a command based at least in part on the second vibration detected by the vibration detector; and
   perform an operation with respect to the audio system corresponding to the command.

7. The audio system of claim 1 further comprising a microphone configured to receive ambient audio.

8. The audio system of claim 7 wherein the hardware processor is further configured to distinguish the second vibration from a third vibration based at least in part on the ambient audio received by the microphone, the third vibration corresponding to the ambient audio.

9. The audio system of claim 7 wherein the hardware processor is further configured to perform echo cancellation using an acoustic model generated by at least in part using the ambient audio received by the microphone.

10. The audio system of claim 1 wherein the hardware processor is further configured to determine a time between a first interaction and a second interaction by the user with the audio system.

11. The audio system of claim 1 further comprising a proximity detector configured to detect a position or motion of a portion of the user.

12. The audio system of claim 11 wherein the hardware processor is further configured to:
   determine a command based at least in part on the position or motion of the portion of the user detected by the proximity detector; and
   perform an operation with respect to the audio system corresponding to the command.

13. The audio system of claim 1 wherein the hardware processor is further configured to:
   generate a user configuration file based on one or more vibrations detected by the vibration detector during a configuration time period corresponding to one or more interactions with the audio system by the user during the configuration time period; and
   distinguish the first vibration and the second vibration from the set of vibrations based at least in part on the audio content received by the audio receiver and the user configuration file.

14. The audio system of claim 13 wherein the configuration time period occurs at an earlier time period than an occurrence of the interaction by the user with the audio system corresponding to the second vibration.

15. A speaker-equipped electronic system comprising:
   a wireless interface configured to receive audio content; and
   a speaker system including a speaker, a vibration detector, and a hardware processor, the speaker configured to output audio corresponding to the audio content, the vibration detector configured to detect a set of vibrations of the speaker system, and the hardware processor configured to distinguish a first vibration and a second vibration from the set of vibrations based at least in part on the audio content, the first vibration corresponding to the audio output by the speaker and the second vibration corresponding to interaction by a user with the speaker system.

16. The speaker-equipped electronic system of claim 15 wherein the vibration detector includes one or more of an accelerometer, a piezoelectric sensor, or a piezoresistive sensor.

17. The speaker-equipped electronic system of claim 15 wherein the hardware processor is further configured to:
   determine a command based at least in part on the second vibration detected by the vibration detector; and
   perform an operation with respect to the speaker system corresponding to the command.

18. The speaker-equipped electronic system of claim 15 wherein the hardware processor is further configured to distinguish the second vibration from a third vibration based at least in part on ambient audio received by a microphone, the third vibration corresponding to the ambient audio.

19. The speaker-equipped electronic system of claim 15 wherein the hardware processor is further configured to:
   determine a command based at least in part on the position or motion of a portion of the user detected by a proximity detector; and
   perform an operation with respect to the speaker system corresponding to the command.

20. A method of controlling a speaker system, the method comprising:
   receiving, at an audio receiver of the speaker system, audio content to be output by the speaker system;
   outputting, using a speaker of the speaker system, audio corresponding to the audio content;
   detecting, using a vibration detector of the speaker system, a set of vibrations of the speaker system;
   distinguishing, using a hardware processor of the speaker system, a first set of vibrations from a second set of vibrations based at least in part on the audio content received by the audio receiver, the first set of vibrations corresponding to the audio output by the speaker and the second set of vibrations corresponding to interaction by a user with the speaker system, the first and second set of vibrations included in the set of vibrations detected by the vibration detector.

* * * * *